United States Patent Office 3,247,439
Patented Apr. 19, 1966

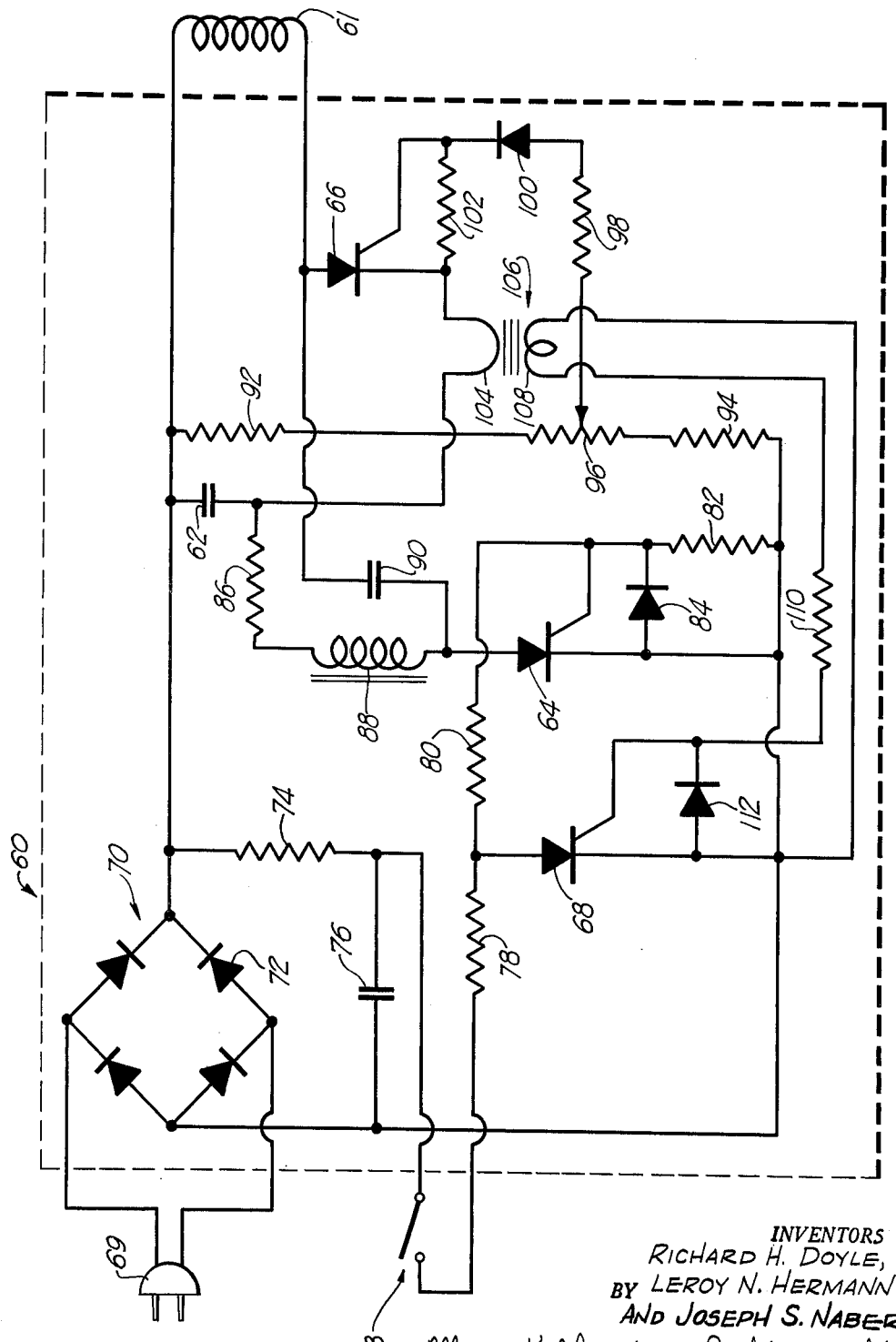

3,247,439
ENERGY SUPPLY CIRCUIT
Richard H. Doyle, Mount Prospect, Joseph S. Naber, Wheeling, and Le Roy N. Hermann, St. Charles, Ill., assignors to Fastener Corporation, Franklin Park, Ill., a corporation of Illinois
Filed Dec. 22, 1961, Ser. No. 161,706
8 Claims. (Cl. 320—1)

This invention relates to an energy supplying circuit and, more particularly, to a new and improved circuit for supplying energy from a potential source to a load through an intermediate capacitive means.

There are many different types of equipment that require, for their proper operation, the delivery of a relatively large amount of electrical power during a rather short time interval. In electric spot welding apparatus, for instance, it is necessary to supply a large amount of electrical energy to the welding electrodes, and the period over which the energy is delivered must be very short to produce the desired fusion of the metal. Similarly, in electrically operated staplers or tackers in which a fastener driving blade is electromagnetically actuated to engage and set a fastener, it is desirable to supply a high power pulse of a short duration to an operating winding so that the blade is provided with a single power impulse and the power loss due to heating is reduced to a minimum.

One common technique of supplying high energy pulses of short duration involves the controlled discharge of capacitive means into the load circuit. However, many prior capacitive charging and discharging circuits lack sufficient control over the charging and discharging cycles, are extremely heavy and unsuitable for use with portable equipment, and are so slow in response that excessive heating occurs with the attendant energy loss and heat dissipation problems.

Accordingly, one object of the present invention is to provide a new and improved circuit for supplying energy to a load.

Another object is to provide a capacitor charging and discharging circuit including new and improved means of controlling the capacitor charging and discharging cycles.

A further object is to provide an energy supplying circuit in which the transfer of energy from a potential source to a load through an intermediate capacitive means is controlled by a plurality of controlled conduction devices.

Another object is to provide a circuit for controlling the operation of a portable tool in which energy is stored in a capacitor in response to the actuation of a switch means and is automatically discharged to a load when sufficient energy has been stored in the capacitor.

Another object is to provide a capacitor charging and discharging circuit including new and improved means for disabling the capacitor controlling circuit after a single energizing signal has been discharged from the capacitor.

A further object is to provide a capacitor charging and discharging circuit including new and improved means for automatically controlling the voltage level to which the capacitor is charged.

In accordance with these and many other objects, one embodiment of the invention comprises a control circuit including capacitive means that are charged by pulsating unidirectional signals from a potential source and are selectively discharged through a load device, such as the winding of an electrically operated stapler or tacker. To provide means for controlling the charging of the capacitive means, a first controlled conduction device having a control electrode is connected between the potential source and the capacitive means, and this control electrode is supplied with an enabling potential under the control of a manually actuated switch that places the first controlled conduction device in a conductive state to charge a capacitive means. The discharging of the capacitive means is controlled by a second controlled conduction device having a control electrode connected to a voltage dividing network connected across the potential supply. The second controlled conduction device is connected in series with the load device and the capacitive means and is normally in a nonconductive state so that the potential across the capacitive means is applied across the second controlled conduction device. Thus, when the first controlled conduction device is placed in a conductive condition and the capacitive means is charged to the value determined by the bias applied to its control electrode, the second controlled conduction device is placed in a conductive state. At this time, the charge accumulated on the capacitive means is discharged through the conductive second controlled conduction device to the load.

The charging circuit for the capacitive means is disabled by a third controlled conduction device having a control electrode in response to the firing of the second controlled conduction device. The third controlled conduction device is conditioned for operation by the actuation of the manual switch used to fire the first controlled conduction device, and the control electrode for the third controlled conduction device is provided with an operating signal from a pulse transformer energized by conduction through the second controlled conduction device. The signal from the pulse transformer places the third control conduction device in a conductive state and is effective to hold the bias for the control element of the first controlled conduction device at a point at which it cannot be placed in a conductive state to re-initiate the charging of the capacitive means. The second controlled conduction device is returned to a nonconductive state when the capacitive means has been discharged, and the third controlled conduction device is restored to a nonconductive state when the manually actuated switch means is released.

Many other objects and advantages of the present invention will become apparent from considering the following detailed description in conjunction with the drawing which forms a schematic diagram of an energy supplying circuit embodying the present invention.

The single sheet of drawings illustrates an improved control circuit 60 that can be used to supply a high energy pulse of short duration to a load device such as an operating winding 61 in an electrically operated stapler or tacker. One type of stapler with which the control circuit 60 can be used is shown in the contemporaneously filed application of Richard H. Doyle et al., Serial No. 161,651, now Patent No. 3,141,171. In staplers or tackers of the type shown in these applications, a fastener driving blade is advanced through a single power stroke by supplying a single high energy pulse to the operating winding 61 under the control of a manually actuated switch means, such as a switch means 63, carried on the housing of the stapler.

The control circuit 60 embodying the present invention reduces the weight of the energy supplying circuit that must be carried by the operator by obviating the need for a tapped input transformer used in the above-identified applications, while retaining a control over the amplitude of the output pulse supplied to the winding 61. In addition, the control circuit 60 reduces the heating of the winding 61 by preventing the flow of an appreciable current through this component except during the discharging cycle of the circuit 60. The circuit 60 also avoids the possibility of improper or accidental operation of the fastener driving tool or stapler by maintaining the circuit 60 in an inactive state until actuated by the operation of the switch means 63.

In general, the control circuit 60 includes a capacitive means or capacitor 62 that is charged under the control of a first controlled conduction device 64 during a charging cycle of the circuit 60 and is discharged through the winding or load 61 under the control of a second controlled conduction device 66. The charging cycle is initiated by the actuation of the switching means 63, which places the device 64 in a conductive state, and is automatically terminated by placing the device 66 in conduction when the capacitor 62 has reached the desired voltage level. When the device 66 is placed in conduction to connect the capacitor 62 in series with the winding 61, a third controlled conduction device 68 is automatically placed in a conductive state to render the device 64 nonconductive and to maintain it in this nonconductive state until the switch 63 is released to terminate the cycle of operation of the control circuit 60.

The control circuit 60 is energized by using a plug 69 and a length of cable to connect a full-wave bridge rectifier network or circuit 70 including a plurality of diodes 72 to a source of conventional 60 cylce alternating current voltage. The output of the bridge network 70 is applied across a network including a resistance element 74 and a capacitor 76. Thus, following the energization of the circuit 60, the capacitor 76 is normally charged to the full output potential of the bridge network 70.

When a cycle of operation of the control circuit 60 is to be initiated, the switch 63 is closed to connect a voltage dividing network including a plurality of resistance elements 78, 80 and 82 in parallel with the capacitor 76. The resistor 82 is connected between the gate or control electrode and the cathode of the controlled conduction device or gated rectifier 64 in parallel with a diode 84 that prevents the application of transient signals of reversed polarity to the cathode-gate path of the rectifier 64. When the switch 63 is closed, the gate or control electrode of the device 64 is biased positive with respect to its cathode, and the device 64 is placed in a conductive condition to connect the capacitor 62 across the output terminals of the bridge network 70 in series with a resistance element 86 and a choke or inductance element 88. The conductive device 64 also connects a capacitor 90 across the output terminals of the bridge 70 in series with the winding 61. Thus, the establishment of a conductive condition in the rectifier 64 initiates the charging of the capacitor 62.

In the normal condition of the control circuit 60, a voltage dividing network including a pair of resistance elements 92 and 94 and a potentiometer 96 is connected across the output terminals of the bridge network 70 to supply an adjustable biasing potential through a resistance element 98 and a diode 100 to the control or gate electrode of the second controlled conduction device or controlled rectifier 66. This control electrode is connected to the cathode of the device 66 by a series resistor 102. The potentiometer 96 is adjusted to provide a continuous bias for the control electrode such that the device 66 is placed in a conductive state only when the potential across the capacitor 62 rises to the desired value.

More specifically, in the normal condition of the control circuit 60, the capacitor 62 is discharged and the controlled rectifier 64 is in a nonconductive state so that an energizing signal is not supplied between the cathode and anode of the rectifier 66. However, when the rectifier 64 is placed in a conductive condition to initiate the charging of the capacitor 62, substantially the full output potential of the bridge 70 appears across the resistance element 86 and the choke 88. This applies a reverse bias to the diode 100. As the capacitor 62 charges, an increasing potential is applied between the cathode and anode of the rectifier 66 with the result that the reverse bias applied to the diode 100 decreases.

When this potential reaches the desired level, as determined by the setting of the potentiometer 96, the rectifier 66 is placed in a conductive condition to connect the capacitor 62 in series with the load or winding 61 through a primary winding 104 of a pulse transformer 106. The capacitor 62 now discharges through the winding 61 to provide a high energy pulse of relative short duration.

The pulse transformer 106 provides means for terminating the charging cycle of the capacitor 62 by placing the device 64 in a nonconductive state. More specifically, a secondary winding 108 of the pulse transformer 106 is connected in series between the negative terminal of the bridge network 70 and the control or gate electrode of the third controlled conduction device or gated rectifier 68 through a series resistor 110. A shunting diode 112 is connected between the cathode and gate electrodes of the device 68 and prevents the application of transients of reversed polarity to these two electrodes. When the device 66 is placed in a conductive state, the flow of current through the primary winding 104 induces a positively directed pulse in the secondary winding 108 that is applied to the control electrode of the device 68 to place this device in a conductive condition. The anode of the device 68 is now supplied with a relatively steady-state direct current potential from the capacitor 76 and also the pulsating waves provided at the output of the bridge network 70 through the resistance element 78 and the closed switch 63. Thus, when the device 68 is placed in conduction, it remains in a conductive state during the zero amplitude portions of the pulsating signals supplied by the bridge network 70 because of the potential provided by the capacitor 76.

When the device 68 is placed in a conductive condition, a low impedance shunt is provided around the resistance elements 80 and 82 so that the control potential is removed from the gate of the rectifier 64. Thus, this device is placed in a nonconductive condition to isolate the capacitor 62 from the charging circuit extending to the output terminals of the bridge network 70. Since the device 68 remains in a conductive condition until the switch 63 is opened to remove its anode potential, the controlled rectifier 64 cannot be returned to a conductive condition until after the switch 63 has been released.

When the switch 63 is released to its normal condition, the anode potential is removed from the controlled rectifier 68 and this rectifier returns to a normal nonconductive state. Further, when the capacitor 62 is fully discharged through the winding 61, an energizing signal is no longer applied across the controlled rectifier 66, and this rectifier returns to a nonconductive condition. The control circuit 60 is now in condition for operation through an additional cycle.

The capacitor 90 provides means for insuring the gated rectifier 66 is returned to a nonconductive state when the switch 63 is released and reoperated too quickly to permit the rectifier 66 to be restored to a nonconductive state in the manner described above. To accomplish this, the capacitor 90 is quickly charged to the full potential of the bridge network 70 through the low ohmic impedance of the winding 61 whenever the rectifier 64 is placed in a conductive state. When the controlled rectifier 66 is then placed in a conductive state to discharge the capacitor 62, the capacitor 90 discharges through the device 66 over a circuit including the resistance element 86 and the choke 88.

If the switch 63 is released and then quickly reoperated so that the device 64 is momentarily rendered nonconductive and then returned to a conductive state, the lower or negative terminal of the capacitor 90 is returned to the negative terminal of the bridge network 70 as soon as the device 64 is again placed in a conductive state. The anode of the device 66 is momentarily clamped at a potential less than the full output potential of the bridge 70 because of the partially charged state of the capacitor 90. At the same time, the full potential of the bridge network 70 appears as a drop across the elements 86 and 88 and momentarily holds the cathode of the device 66 at substantially the full output potential of the bridge 70. Thus, the anode of the device 66 is biased negative with respect to its cathode, and this rectifier is quickly placed in a nonconductive condition if it was not previously in this state.

Accordingly, the control circuit 60 supplies a high energy pulse to the operating winding 61 and, by obviating the need for an input power transformer, reduces the weight that is carried by the stapler operator without sacrificing the control over the potential to which the capacitor 62 is charged. In addition, the capacitor 62 in the control circuit 60 is not in a normally charged condition and provides a circuit by which the stapler cannot be inadvertently operated by the failure of one of the switching components. Since the winding 61 is not included in the charging circuit for the capacitor 62 and is connected to an energy source only during the period in which the stapler or tacker is to be operated, the heating of this winding is reduced to a minimum.

The values and types of components used in one control circuit 60 constructed in accordance with the invention are listed below. However, it should be understood that many other types and values of components can be used with the present invention in accordance with the desired output signal.

| | |
|---|---|
| Capacitor 62 | 3000–10,000 μfd. |
| Controlled rectifier 64 | General Electric Type C11B. |
| Controlled rectifier 66 | Texas Instruments Type 153. |
| Controlled rectifier 68 | Texas Instruments 2N1597. |
| Diodes 72 | Sarkes-Tarzian 40J2. |
| Resistor 74 | 2K. |
| Capacitor 76 | 16 μfd. |
| Resistor 78 | 5K |
| Resistor 80 | 2K. |
| Resistor 82 | 330 ohms. |
| Diodes 84, 100 and 112 | IN536. |
| Resistor 86 | 1 ohm. |
| Inductor 88 | 3 mh. |
| Capacitor 90 | 16 μfd. |
| Resistor 92 | 5K |
| Resistor 94 | 1K. |
| Potentiometer 96 | 2K. |
| Resistors 98, 102 and 110 | 330 ohms. |

In one control circuit 60 constructed in accordance with the present invention and embodying the types and values of components listed above, an output pulse having a peak current between 50 and 175 amperes persisting over a duration of from 6 to 12 milliseconds was provided.

Although the invention has been described with reference to one embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A circuit for supplying energy to a load comprising a potential source, a normally discharged capacitive means connected to said load for supplying energy to said load, first controlled conduction means having a control electrode, first circuit means including said first controlled conduction means for rendering said potential source effective to charge said capacitive means, second circuit means including switching means for connecting said potential source to said control electrode to place said first controlled conduction device in a conductive condition to initiate the charging of said capacitive means, a second controlled conduction means connected to said potential source by said switching means, and third circuit means including said second controlled conduction means for holding said first controlled conduction means in a nonconductive state, said third circuit means including means responsive to the discharge of energy from the capacitive means to the load for placing the second controlled conduction means in a conductive condition.

2. In a circuit for supplying energy to a load, a potential source, capacitive means for supplying energy to said load, first controlled conduction means for connecting said capacitive means to said potential source, first circuit means including switching means for rendering said first controlled conduction means effective to control the charging of said capacitive means, second controlled conduction means for controlling the conductivity of said first controlled conduction means, second circuit means including said switching means for preparing said second controlled conduction means for operation, and third circuit means responsive to the discharge of energy from said capacitive means for placing said second controlled conduction means in conduction to terminate conduction through the first controlled conduction means.

3. The circuit set forth in claim 2 in which said potential source provides pulsating unidirectional signals and in which said second circuit means includes means energized by said potential source for supplying said second controlled conduction means with a relatively stable operating potential.

4. The circuit set forth in claim 2 in which said second controlled conduction means includes a control electrode and in which said third circuit means includes a signal generating network coupled between said capacitive means and said control electrode.

5. A control circuit comprising a potential source, capacitive means, a first controlled conduction device having a control electrode, first circuit means including said first controlled conduction device for connecting said capacitive means to said potential source, a second controlled conduction device having a control electrode, load means, second circuit means connecting said capacitive means and said second controlled conduction device in series with said load means so that the potential across said capacitive means is normally applied across said second controlled conduction device when said second device is in a nonconductive state and so that the charge on said capacitive means is discharged to said load means through said second controlled conduction device when said second device is in a conductive state, means for applying a fixed bias to said control electrode so that said second controlled conduction device is rendered conductive when the potential across said capacitive means reaches a known value, and control means responsive to the establishment of a conductive condition in said second controlled conduction device for placing said first controlled conduction device in a nonconductive state, said control means including a network for feeding a conduction inhibiting signal to the control electrode of the first controlled conduction device.

6. The control circuit set forth in claim 5 including manually controlled means for placing said first controlled conduction device in a conductive state to initiate the charging of said capacitive means.

7. In a circuit for supplying energy from a potential source to a load, capacitive means connected to the potential source to be charged thereby, rectifier means for connecting said capacitive means in a series circuit with the load and having a control electrode, a biasing network for applying an enabling signal of a predetermined potential to the control electrode, a diode gate connected between the control electrode and the biasing network, and circuit means coupling the diode gate to the capacitive means to apply an inhibiting potential to the diode gate until the potential to which the capacitive means has been charged approaches the level of the potential source, the biasing network and the circuit means then providing a forward bias to the diode gate to apply the enabling signal to the control electrode so that the rectifier means is placed in conduction.

8. A control circuit comprising a potential source, capacitive means, a first controlled conduction device having a control electrode, first circuit means including said first controlled conduction device for connecting said capacitive means to said potential source, a second controlled conduction device having a control electrode, load means, second circuit means connecting said capacitive means and said second controlled conduction device in series with said load means so that the potential across said capacitive means is normally applied across said second controlled conduction device when said second device is in a nonconductive state and so that the charge on said capacitive means is discharged to said load means through said second controlled conduction device when said second device is in a conductive state, means for applying a fixed bias to said control electrode so that said second controlled conduction device is rendered conductive when the potential across said capacitive means reaches a known value, control means including a third controlled conduction device for holding said first controlled conduction device in a nonconductive state, and means responsive to the establishment of a conductive condition in said second controlled conduction device for placing said third controlled conduction device in a conductive state.

References Cited by the Examiner

UNITED STATES PATENTS

| | | | |
|---|---|---|---|
| 2,428,390 | 10/1947 | Smith | 320—1 |
| 2,716,211 | 8/1955 | Aas | 320—1 |
| 2,943,169 | 6/1960 | Kalfaian | 320—1 |

IRVING L. SRAGOW, *Primary Examiner.*